United States Patent
Aizawa et al.

(10) Patent No.: US 8,061,203 B2
(45) Date of Patent: Nov. 22, 2011

(54) COMBINED SENSOR

(75) Inventors: Hiroyuki Aizawa, Osaka (JP); Satoshi Ohuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 12/375,109

(22) PCT Filed: Aug. 9, 2007

(86) PCT No.: PCT/JP2007/065583
§ 371 (c)(1),
(2), (4) Date: Jan. 26, 2009

(87) PCT Pub. No.: WO2008/023573
PCT Pub. Date: Feb. 28, 2008

(65) Prior Publication Data
US 2009/0183569 A1 Jul. 23, 2009

(30) Foreign Application Priority Data
Aug. 21, 2006 (JP) .................................. 2006-223806

(51) Int. Cl.
*G01C 23/00* (2006.01)
*G01C 19/56* (2006.01)
(52) U.S. Cl. ........................................ 73/510; 73/504.04
(58) Field of Classification Search .................... 73/493, 73/510, 511, 504.04, 504.16
See application file for complete search history.

(56) References Cited

U.S. PATENT DOCUMENTS
6,725,719 B2* 4/2004 Cardarelli .................. 73/504.04
2009/0013784 A1* 1/2009 Ohkoshi ..................... 73/504.16

FOREIGN PATENT DOCUMENTS
| JP | 2001-074767 A | 3/2001 |
| JP | 2001-208546 A | 8/2001 |
| JP | 2002-5951 A | 1/2002 |
| JP | 2003-14778 A | 1/2003 |
| JP | 2006-125887 A | 5/2006 |
| JP | 2007-108044 A | 4/2007 |

OTHER PUBLICATIONS
International Search Report for PCT/JP2007/065583.

* cited by examiner

*Primary Examiner* — John Chapman, Jr.
(74) *Attorney, Agent, or Firm* — Pearne & Gordon LLP

(57) ABSTRACT

A combined detection element (6) of the present invention includes an acceleration detection element (2) and an angular velocity detection element (4) stacked on the acceleration detection element (2) in such a manner as to avoid contacting with the weight parts (12) of the acceleration detection element (2). The angular velocity detection element (4) includes a recess (26) in a surface thereof facing the weight parts (12) of the acceleration detection element (2) so as to avoid contacting with the weight parts (12). At least part of the recess (26) has a depth not exceeding the vertical range of motion of weight parts (12), thereby suppressing the upward movement of weight parts (12).

4 Claims, 5 Drawing Sheets

COMBINED SENSOR

TECHNICAL FIELD

The present invention relates to a combined sensor for detecting angular velocity and acceleration, which is used in various electronic devices for attitude control or navigation of mobile objects such as aircrafts, automobiles, robots, marine vehicles, and other vehicles.

BACKGROUND ART

Conventional combined sensors for detecting angular velocity and acceleration are generally formed of angular velocity sensors for detecting angular velocity and acceleration sensors for detecting acceleration.

Therefore, in order to detect angular velocity and acceleration at the same time, an electronic device is required to have a plurality of angular velocity sensors and a plurality of acceleration sensors mounted on the substrate.

In general, an angular velocity sensor detects angular velocity by vibrating a detection element that can be formed in different shapes such as tuning-fork-shaped, H-shaped, or T-shaped, and by electrically detecting distortion of the angular velocity detection element caused by the Coriolis force. An acceleration sensor has weight parts and detects acceleration by making an acceleration detection element compare the acceleration before and after the movement of the weight parts. A combined sensor includes, for example, an angular velocity sensor and an acceleration sensor so as to detect angular velocity and acceleration at the same time.

These angular velocity sensors, acceleration sensors, and combined sensors are positioned along the respective axes of an attitude control system or a navigation system used in motor vehicles or other mobile objects.

Such a conventional technique related to the present invention is shown, for example, in Patent Documents 1 and 2 below.

In the aforementioned structure, the angular velocity sensors and the acceleration sensors are individually mounted on the substrate in such a manner as to be positioned along the respective axes for detecting angular velocity or acceleration. This requires a large mounting area, thus preventing the miniaturization of the combined sensor.

Patent Document 1: Japanese Patent Unexamined Publication No. 2001-208546

Patent Document 2: Japanese Patent Unexamined Publication No. 2001-74767

SUMMARY OF THE INVENTION

In view of the above, an object of the present invention is to provide a combined sensor for detecting angular velocity and acceleration, which requires a smaller mounting area, thereby being miniaturized.

The combined detection element of the present invention includes an acceleration detection element and an angular velocity detection element stacked on the acceleration detection element in such a manner as to avoid contacting with the weight parts of the acceleration detection element. In addition, the angular velocity detection element includes suppressing portions for suppressing the upward movement of the weight parts of the acceleration detection element. The combined detection element, which is thus structured by stacking the angular velocity detection element and the acceleration detection element on top of each other, requires a smaller mounting area, thereby being miniaturized.

As described above, the angular velocity detection element is stacked on the acceleration detection element in such a manner as to avoid contacting with the weight parts of the acceleration detection element. In addition, the angular velocity detection element includes the suppressing portions for suppressing the upward movement of the weight parts of the acceleration detection element. Therefore, even when acceleration exceeding the allowable vertical movement of the weight parts is applied, the suppressing portions for suppressing the vertical movement of the weight parts limit the vertical range of motion within a specified range, thereby preventing the breakage of the acceleration detection element. The suppression of the vertical movement also prevents the breakage of the angular velocity detection element. The acceleration detection element detects an acceleration signal, which is then electrically processed, so that the acceleration detection element functions as an acceleration sensor. The angular velocity detection element detects an angular velocity signal, which is then electrically processed, so that the angular velocity detection element functions as an angular velocity sensor. Thus, in the combined detection element of the present invention, the angular velocity detection element and the acceleration detection element stacked on top of each other detect these signals which are then electrically processed. As a result, the detection elements function as an acceleration sensor and an angular velocity sensor, respectively, thereby functioning as a combined sensor including an acceleration sensor and an angular velocity sensor.

Figure 1:
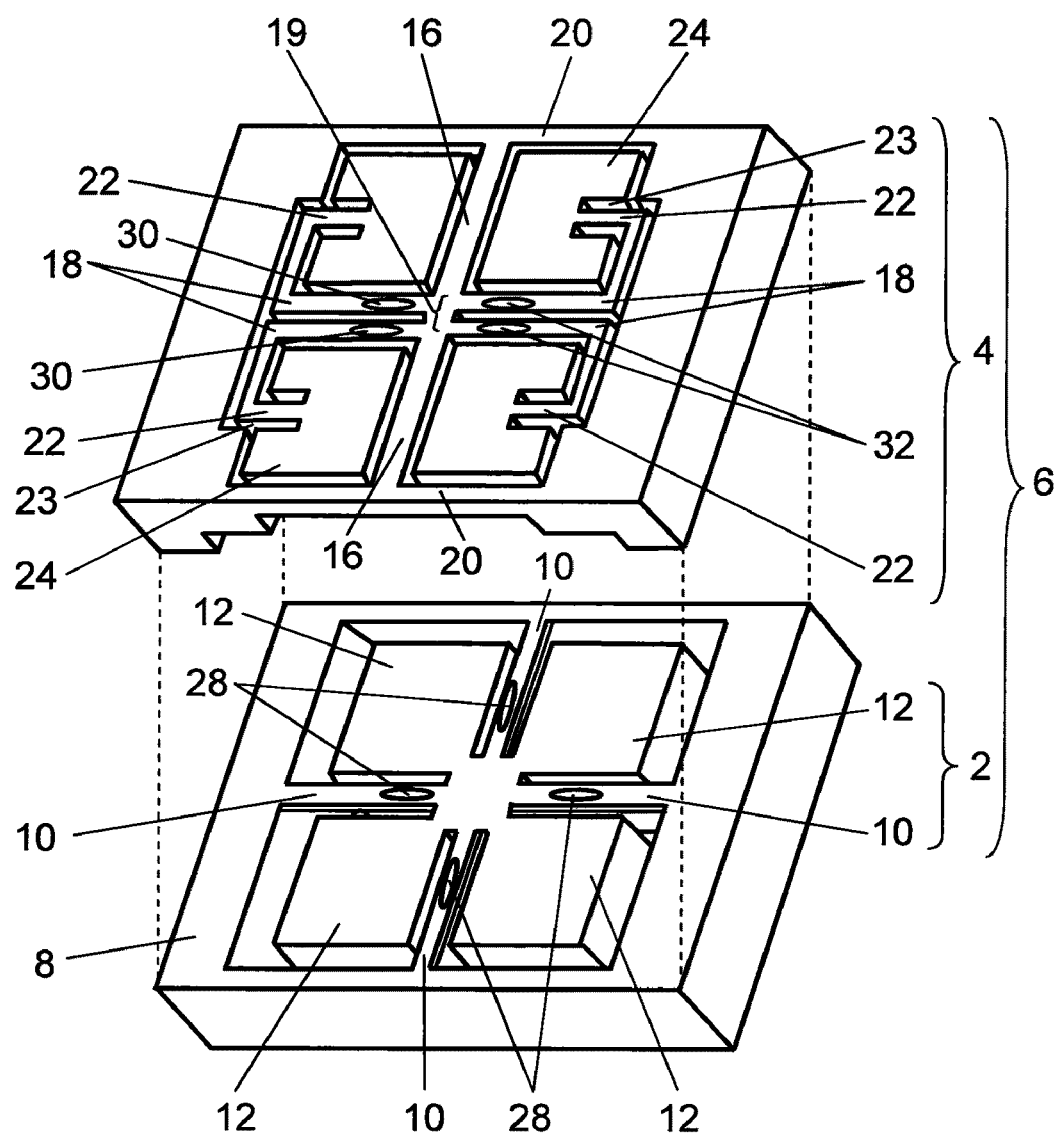
FIG. 1 is an exploded perspective view of a combined detection element which forms a combined sensor according to an embodiment of the present invention.

REFERENCE MARKS IN THE DRAWINGS 2 acceleration detection element
4 angular velocity detection element
6 combined detection element
8 fixing arm
10 connecting arm
12, 24 weight part
16 first arm
18 second arm
19 support portion 20 third arm
22 opposing portion
23 groove
25 suppressing portion
26 recess
27 notch
28, 32 sensing portion
30 driving portion

DETAILED DESCRIPTION OF PREFERRED EMBODIMENT

An embodiment of the present invention is described as follows with reference to drawings. In the drawings, some components are shown in an enlarged scale for easier understanding. The same components are referred to with the same numerals and hence the description of these components may be omitted.

First Embodiment

Figure 2:
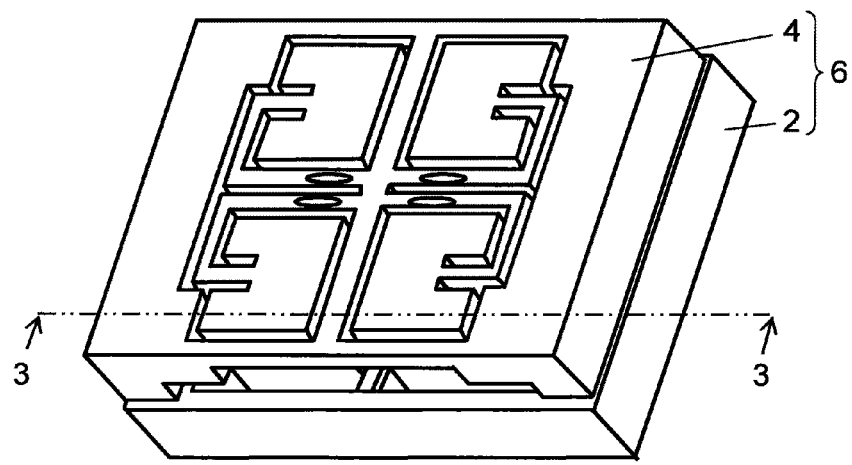
FIG. 2 is a perspective view of the combined detection element which forms a combined sensor according to the embodiment of the present invention.
Figure 3:
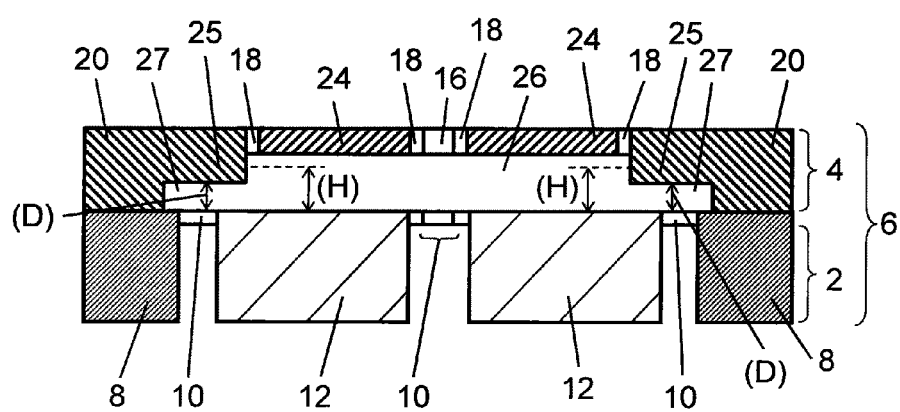
FIG. 3 is a sectional view of the combined detection element which forms a combined sensor according to the embodiment of the present invention taken along line 3-3 of FIG. 2.

FIG. 1 is an exploded perspective view of a combined detection element which forms a combined sensor according to an embodiment of the present invention. FIG. 2 is a perspective view of the combined detection element. FIG. 3 is a sectional view of the combined detection element taken along line 3-3 of FIG. 2. The combined sensor of the present invention includes a combined detection element and a signal processor (not shown) for electrically processing a detection signal received from the combined detection element.

The combined sensor according to the embodiment shown in FIGS. 1 to 3 includes combined detection element 6 having acceleration detection element 2 and angular velocity detection element 4.

Acceleration detection element 2 includes frame-like fixing arm 8 fixed to a mounting substrate, four connecting arms 10 connected together at one end and connected to fixing arm 8 at the other end, and weight parts 12 used for detecting acceleration. Weight parts 12 are arranged between four connecting arms 10 and connected to one end of each of four connecting arms 10. Four connecting arms 10 can be bent due to the movement of weight parts 12.

Angular velocity detection element 4 includes two first orthogonal arms, two second orthogonal arms, and support portion 19. The first orthogonal arms are each T-shaped in which one first arm 16 is sandwiched in a substantially orthogonal direction between two second arms 18 and connected thereto. The two second orthogonal arms each consist of one first arm 16 and one third arm 20 connected in a substantially orthogonal direction thereto. Support portion 19 supports at its center the two adjacent first orthogonal arms. The ends of each of third arms 20 extend at right angles from the main portions of third arms 20 so as to be connected together in a frame shape.

Second arms 18 include opposing portions 22 bent to face the main portions of second arms 18, and the ends of second arms 18 are connected to weight parts 24, which are used for detecting angular velocity and have grooves 23.

As shown in FIGS. 2 and 3, angular velocity detection element 4 is stacked on acceleration detection element 2 in such a manner as to avoid contacting with weight parts 12 of acceleration detection element 2. In addition, angular velocity detection element 4 includes suppressing portions 25 (described later) for suppressing the upward movement of weight parts 12 of acceleration detection element 2. Angular velocity detection element 4 further includes recess 26 on a surface thereof facing weight parts 12 of acceleration detection element 2 so as to avoid contacting with weight parts 12. At least part of recess 26 has a depth (D) not exceeding the vertical range of motion (H) of weight parts 12. This structure forms suppressing portions 25 for suppressing the upward movement of weight parts 12 of acceleration detection element 2.

More specifically, as shown in FIG. 3, third arms 20 of angular velocity detection element 4 are fixedly stacked on fixing arm 8 of acceleration detection element 2. Weight parts 24, first arms 16, and second arms 18 are made thinner than third arms 20. Third arms 20 are partially cut to form notches 27, which have a depth (D) not exceeding the vertical range of motion (H) of weight parts 12 of acceleration detection element 2.

In combined detection element 6, four connecting arms 10 function as arms to be bent due to the movement of weight parts 12, and acceleration detection element 2 detects acceleration from the change of state of connecting arms 10. As shown in FIG. 1, four connecting arms 10 have sensing portions 28 for detecting the change of state of connecting arms 10. Sensing portions 28 are sensing electrode portions for detecting distortions of connecting arms 10, and can be formed of piezoresistive or piezoelectric elements.

Second arms 18 function as driving-vibration arms and also as arms to be bent by the Coriolis force. Therefore, angular velocity detection element 4 detects angular velocity from the change of state of second arms 18. In angular velocity detection element 4, two opposite ones of four second arms 18 are provided near support portion 19 with driving portions 30 for driving and vibrating their weight parts 24. Driving portions 30 are driving electrode portions for driving and vibrating the two second arms 18 and hence driving and vibrating their weight parts 24. The driving electrode portions are each formed of upper and lower electrodes with a piezoelectric body interposed therebetween. The other two second arms 18 are provided near support portion 19 with sensing portions 32 for detecting the change of state of the two second arms 18. Sensing portions 32 are sensing electrode portions for detecting distortions of the two second arms 18, and can be formed of piezoresistive or piezoelectric elements.

Figure 4:
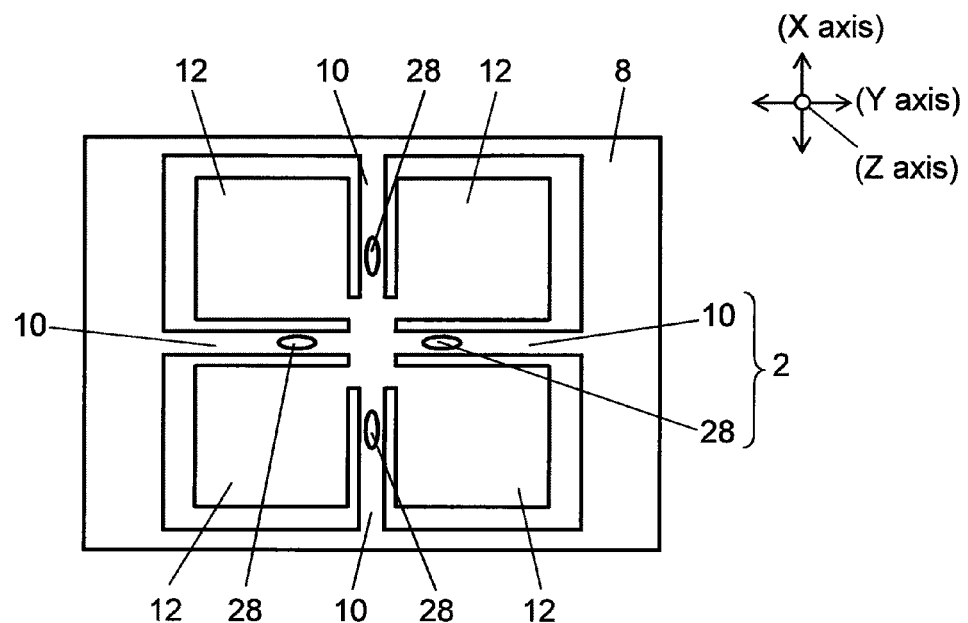
FIG. 4 is a plan view of an acceleration detection element included in the combined detection element according to the embodiment of the present invention, showing an operating condition of the combined detection element.
Figure 5:
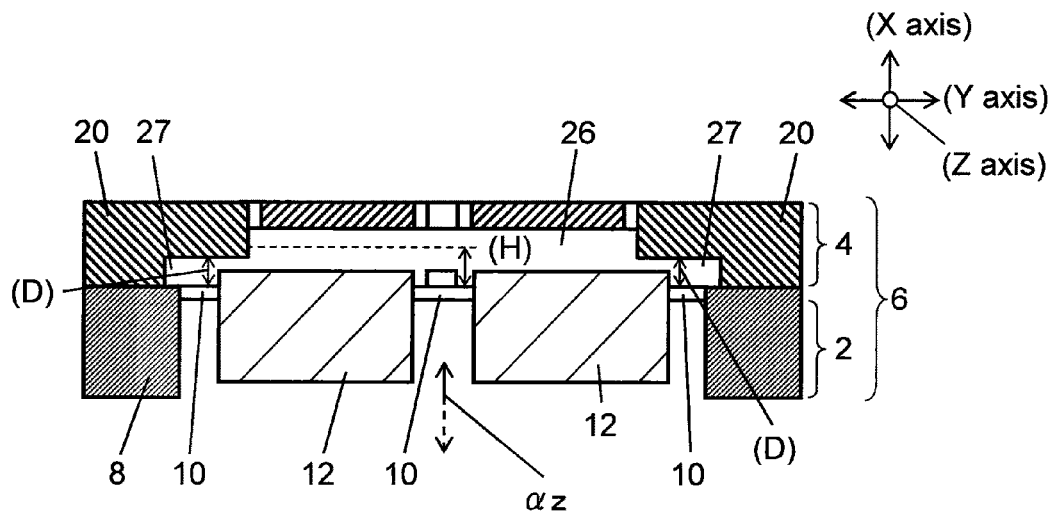
FIG. 5 is a sectional view showing an operating condition of the combined detection element according to the embodiment of the present invention.
Figure 6:
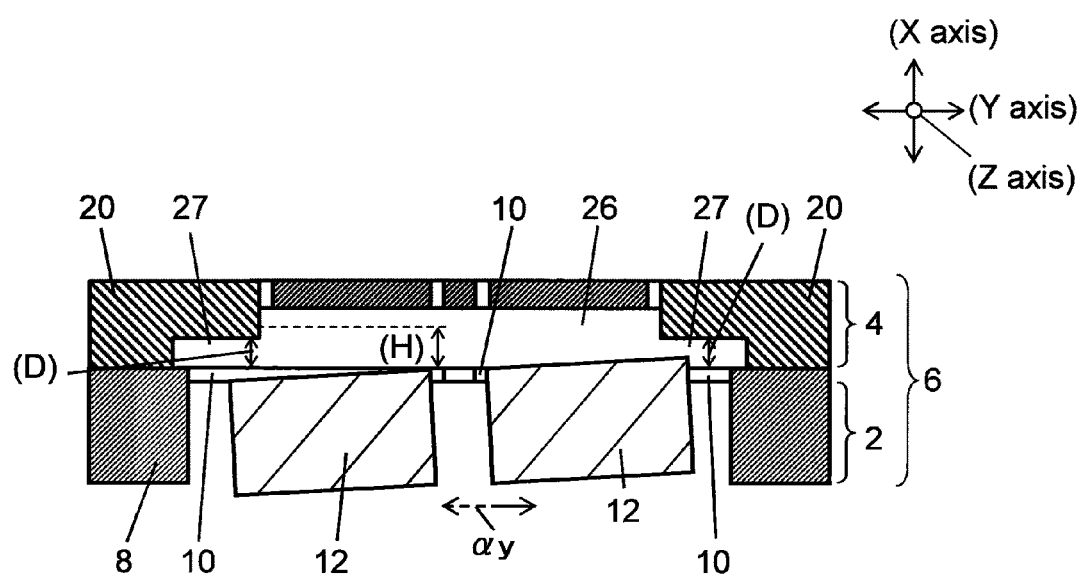
FIG. 6 is a sectional view showing another operating condition of the combined detection element according to the embodiment of the present invention.
Figure 7:
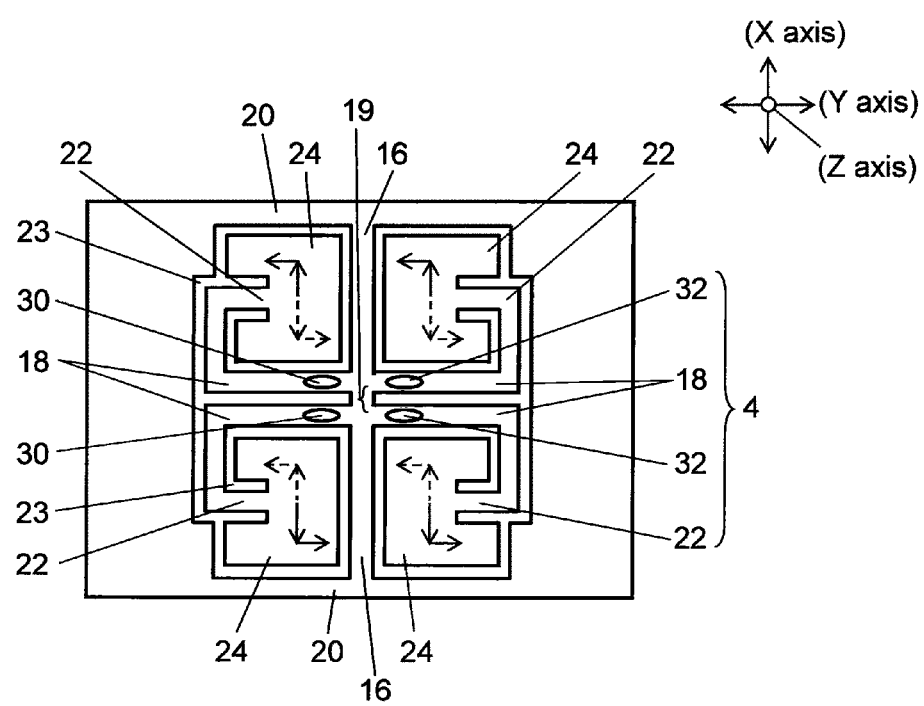
FIG. 7 is a plan view of an angular velocity detection element included in the combined detection element according to the embodiment of the present invention, showing an operating condition of the combined detection element.

FIGS. 4, 5, 6, and 7 show operating conditions of combined detection element 6. FIG. 4 is a plan view of acceleration detection element 2 included in combined detection element 6. FIG. 5 is a sectional view showing an operating condition of combined detection element 6. FIG. 6 is a sectional view of another operating condition of combined detection element 6. FIG. 7 is a plan view of angular velocity detection element 4 included in combined detection element 6.

The following is a description of the operation of acceleration detection element 2 included in combined detection element 6.

It is assumed as shown in FIGS. 4 to 6 that four connecting arms 10 of acceleration detection element 2 are placed in the x- and y-axis directions when x, y, and z are orthogonal axes. When acceleration $\alpha z$ is applied in the z-axis direction as shown in FIG. 5, weight parts 12 start to be displaced in the z-axis direction and make connecting arms 10 cause distortion due to the acceleration $\alpha z$.

When acceleration $\alpha y$ is applied in the y-axis direction as shown in FIG. 6, weight parts 12 start to be displaced in the y-axis direction and make connecting arms 10 cause distortion due to the acceleration $\alpha y$. Weight parts 12, which are fixed to connecting arms 10, start to be displaced in the z-axis direction while being rotated.

As shown in FIG. 4, sensing portions 28 placed on connecting arms 10 detect distortions of connecting arms 10 (the change of state of connecting arms 10), thereby detecting acceleration.

In acceleration detection element 2, if excessive acceleration αz is applied in the z-axis direction as shown in FIG. 5, weight parts 12 start to move in the z-axis direction, but come into contact with angular velocity detection element 4 in notches 27 of angular velocity detection element 4, thereby being suppressed from moving upwardly. This is because notches 27 have a depth (D) not exceeding the vertical range of motion (H) in recess 26 of weight parts 12 of acceleration detection element 2. If the depth (D) of notches 27 exceeds the vertical range of motion (H) of weight parts 12, connecting arms 10 connected to weight parts 12 may be broken although weight parts 12 do not come into contact with angular velocity detection element 4.

Notches 27 are formed in third arms 20 of angular velocity detection element 4, and third arms 20 are placed on fixing arm 8 of acceleration detection element 2. Therefore, even if weight parts 12 come into contact with third arms 20, the contact does not affect angular velocity detection element 4. More specifically, third arms 20 function as fixing arms for fixing acceleration detection element 2 and are not bent by the Coriolis force. Thus, third arms 20 do not affect the driving and vibration of weight parts 24 of angular velocity detection element 4, and do not reduce the sensitivity of angular velocity detection element 4.

Similarly, if excessive acceleration ay is applied in the y-axis direction as shown in FIG. 6, weight parts 12, which are fixed to connecting arms 10, start to be displaced in the z-axis direction while being rotated. However, weight parts 12 come into contact with angular velocity detection element 4 in notches 27 of angular velocity detection element 4, thereby being suppressed from moving upwardly.

The following is a description of the operation of angular velocity detection element 4 included in combined detection element 6.

It is assumed as shown in FIG. 7 that first arms 16 and second arms 18 of angular velocity detection element 4 are placed in the x- and y-axis directions, respectively, when x, y, and z are orthogonal axes. When an AC voltage at the resonant frequency is applied to driving portions 30, the second arms 18 that include driving portions 30 start to drive and vibrate first, and then the remaining second arms 18 start to drive and vibrate. As a result, weight parts 24 also start to drive and vibrate in the direction perpendicular to second arms 18, that is, in the direction of driving and vibration shown by the solid arrows and the dotted arrows continuing thereto.

After all, four second arms 18 and four weight parts 24 synchronously drive and vibrate in the direction perpendicular to opposing portions 22 of second arms 18. The direction of driving and vibration in angular velocity detection element 4 corresponds to the x-axis direction. When angular velocity is generated counterclockwise in the z axis, Coriolis force is generated synchronously with the driving and vibration of weight parts 24 in the direction orthogonal to the direction of driving and vibration of weight parts 24, that is, in the Coriolis force direction shown by the solid arrows and the dotted arrows separate therefrom. This allows second arms 18 to cause distortion due to the angular velocity generated counterclockwise in the z axis. Sensing portions 32 detect distortions due to the change of state of second arms 18, thereby detecting angular velocity.

As described above, combined detection element 6 is formed by stacking acceleration detection element 2 and angular velocity detection element 4 on top of each other. This structure makes it unnecessary to individually place a detection element for detecting acceleration and a detection element for detecting angular velocity, thereby requiring a smaller mounting area and hence miniaturizing the combined sensor. The acceleration signal and the angular velocity signal detected by combined detection element 6 are electrically processed so that combined detection element 6 and the signal processor operate as the combined sensor. Thus, the combined sensor requires a smaller mounting area, thereby being miniaturized.

As mentioned above, angular velocity detection element 4 is stacked on acceleration detection element 2 in such a manner as to avoid contacting with weight parts 12 of acceleration detection element 2. In addition, angular velocity detection element 4 includes the suppressing portions for suppressing the upward movement of weight parts 12 of acceleration detection element 2. Therefore, even when acceleration exceeding the allowable vertical range of motion of weight parts 12 is applied, the suppressing portions for suppressing the movement of weight parts 12 limit the vertical range of motion within the specified range, thereby preventing the breakage of acceleration detection element 2. The suppression of the upward movement also prevents the breakage of angular velocity detection element 4.

In angular velocity detection element 4 of the combined sensor according to the embodiment of the present invention, two opposite ones of four second arms 18 are provided with driving portions 30, and the other two second arms 18 are provided with sensing portions 32. Alternatively, however, at least one of the four second arms 18 may be provided with driving portion 30 and at least one of the four second arms 18 may be provided with sensing portion 32.

INDUSTRIAL APPLICABILITY

The combined sensor of the present invention, which can detect both acceleration and angular velocity, is miniaturized by reducing the mounting area, thereby being applicable to various electronic devices.

The invention claimed is:

1. A combined sensor comprising:
a combined detection element including:
   an angular velocity detection element and
   an acceleration detection element,
      the acceleration detection element including:
         a weight part and
         an arm connected to the weight part and to be bent, and
      the angular velocity detection element including:
         a driving-vibration arm and
         an arm to be bent by Coriolis force, wherein
   the angular velocity detection element is stacked on the acceleration detection element in such a manner as to avoid contacting with the weight part of the acceleration detection element; and
   the angular velocity detection element has a suppressing portion for suppressing upward movement of the weight part of the acceleration detection element.

2. The combined sensor of claim 1, wherein
the angular velocity detection element includes a recess on a surface thereof facing the weight part of the acceleration detection element so as to avoid contacting with the weight part, at least part of the recess having a depth not exceeding a vertical range of motion of the weight part.

3. The combined sensor of claim 1, wherein
the angular velocity detection element includes two orthogonal arms each formed by connecting a first arm in a direction orthogonal to second arms, a support portion for supporting the two first arms, and two orthogonal arms each formed by connecting the first arm in a direction orthogonal to a third arm, wherein the third arms are fixed to the acceleration detection element;

the weight part, the first arms, and the second arms are thinner than the third arms; and the third arms are partially cut to form a notch having a depth not exceeding the vertical range of motion of the weight part of the acceleration detection element.

4. The combined sensor of claim 3, wherein the acceleration detection element includes the arm connected to the weight part and to be bent, and a fixing arm to be fixed to a mounting substrate, and the third arms of the angular velocity detection element are fixedly stacked on the fixing arm of the acceleration detection element.

* * * * *